United States Patent
Aoki et al.

(10) Patent No.: US 12,497,518 B2
(45) Date of Patent: Dec. 16, 2025

(54) RESIN-COATED METAL POWDER, METHOD FOR PRODUCING SAME AND AQUEOUS COATING COMPOSITION USING SAME

(71) Applicant: SHIN-ETSU CHEMICAL CO., LTD., Tokyo (JP)

(72) Inventors: Shotaro Aoki, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 725 days.

(21) Appl. No.: 17/769,629

(22) PCT Filed: Oct. 14, 2020

(86) PCT No.: PCT/JP2020/038757
§ 371 (c)(1),
(2) Date: Apr. 15, 2022

(87) PCT Pub. No.: WO2021/075457
PCT Pub. Date: Apr. 22, 2021

(65) Prior Publication Data
US 2024/0052172 A1 Feb. 15, 2024

(30) Foreign Application Priority Data

Oct. 18, 2019 (JP) ................ 2019-190949
Sep. 4, 2020 (JP) ................ 2020-148736

(51) Int. Cl.
| | |
|---|---|
| C09D 5/02 | (2006.01) |
| B22F 1/102 | (2022.01) |
| B32B 7/00 | (2019.01) |
| C09C 1/62 | (2006.01) |
| C09C 3/12 | (2006.01) |
| C09D 163/00 | (2006.01) |
| B22F 1/05 | (2022.01) |

(52) U.S. Cl.
CPC .............. C09D 5/027 (2013.01); B22F 1/102 (2022.01); C09C 1/625 (2013.01); C09C 3/12 (2013.01); C09D 5/028 (2013.01); C09D 163/00 (2013.01); B22F 1/05 (2022.01)

(58) Field of Classification Search
CPC . C09D 5/08; C09D 5/082; C09D 5/10; C09D 5/106; Y10T 428/2991; Y10T 428/2995
See application file for complete search history.

(56) References Cited

U.S. PATENT DOCUMENTS

| | | | |
|---|---|---|---|
| 2005/0027056 A1 | 2/2005 | Endo et al. | |
| 2006/0233958 A1* | 10/2006 | Matsumura | C09D 5/08 |
| | | | 106/14.05 |
| 2014/0315030 A1* | 10/2014 | Niimoto | B63B 59/04 |
| | | | 524/92 |
| 2016/0304721 A1 | 10/2016 | Hippmann et al. | |
| 2018/0086898 A1* | 3/2018 | Uchida | C09D 5/08 |

FOREIGN PATENT DOCUMENTS

| | | | | |
|---|---|---|---|---|
| DE | 3436410 C2 * | 1/1988 | | G03G 9/1137 |
| EP | 0 775 733 A1 | 5/1997 | | |
| EP | 3 421 560 A1 | 1/2019 | | |
| JP | 62-275113 A | 11/1987 | | |

(Continued)

OTHER PUBLICATIONS

Translation WO 2019203182 A1 (Year: 2019).*
Translation KR 20190103651 A (Year: 2019).*
Translation WO 2018221266 A1 (Year: 2018).*
Translation DE-3436410-C2 (Year: 1988).*
Extended European Search Report for corresponding European Application No. 20876087.6, dated Oct. 13, 2023.
International Search Report (PCT/ISA/210) issued in PCT/JP2020/038757, dated Dec. 15, 2020.
Written Opinion of the International Searching Authority (PCT/ISA/237) issued in PCT/JP2020/038757, dated Dec. 15, 2020.

*Primary Examiner* — Hoa (Holly) Le
(74) *Attorney, Agent, or Firm* — Birch, Stewart, Kolasch & Birch, LLP

(57) ABSTRACT

A resin-coated metal powder according to the present invention is obtained by covering at least a part of the surface of a metal powder with a hydrolyzable resin that has an average composition of general formula (1) and a number average molecular weight of from 500 to 100,000; and this resin-coated metal powder exhibits sufficient dispersibility in an aqueous solution, while being stable for a relatively long period of time even in the coexistence of water in an aqueous coating material.

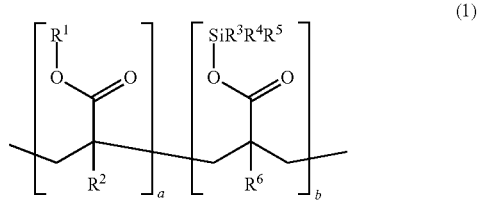

(1)

(In the formula, $R^1$ represents a linear or branched monovalent hydrocarbon group having from 1 to 10 carbon atoms, said group optionally having a specific substituent such as a hydroxyalkyl group; each of $R^3$, $R^4$ and $R^5$ independently represents a linear or branched monovalent hydrocarbon group having from 1 to 10 carbon atoms; each of $R^2$ and $R^6$ independently represents a hydrogen atom or a linear or branched monovalent hydrocarbon group having from 1 to 10 carbon atoms; and a and b represent numbers that satisfy $0 \leq a < 1$, $0 < b \leq 1$ and $(a+b)=1$.)

9 Claims, No Drawings

(56) References Cited

FOREIGN PATENT DOCUMENTS

| | | | |
|---|---|---|---|
| JP | 63-57678 A | 3/1988 | |
| JP | 10-130545 A | 5/1998 | |
| JP | 2005-194490 A | 7/2005 | |
| JP | 2008-272666 A | 11/2008 | |
| JP | 4633224 B2 | 2/2011 | |
| JP | 2014-37558 A | 2/2014 | |
| JP | 2017-508016 A | 3/2017 | |
| KR | 20190103651 A * | 9/2019 | |
| WO | WO-2010070728 A1 * | 6/2010 | ............. C09D 5/084 |
| WO | WO-2018221266 A1 * | 12/2018 | ............... B05D 1/38 |
| WO | WO-2019203182 A1 * | 10/2019 | .......... C08F 220/281 |

* cited by examiner

RESIN-COATED METAL POWDER, METHOD FOR PRODUCING SAME AND AQUEOUS COATING COMPOSITION USING SAME

TECHNICAL FIELD

The present invention relates to a resin-coated metal powder, method for producing the resin-coated metal powder, and an aqueous coating composition using the resin-coated metal powder.

BACKGROUND ART

Coating materials containing a metal powder have been widely used conventionally because such coating materials can impart metallic luster and corrosion resistance to coated products.

For example, it is known that a metal having a high ionization tendency such as magnesium, aluminum, or zinc serves as a sacrificial anode to exhibit an anticorrosive effect on a metal having a lower ionization tendency.

One of the coating materials using such an anticorrosive effect is a coating material containing a metal powder such as a zinc, magnesium, or aluminum powder at a high concentration, and is widely used as an anticorrosive coating material for land steel structures such as bridges, plants, and tanks, and marine steel structures.

Conventional anticorrosive coating materials are roughly classified into organic anticorrosive coating materials and inorganic anticorrosive coating materials according to the kind of the base resin used as a vehicle.

In the former organic anticorrosive coating materials, an epoxy resin and an amine curing agent are mainly used as a vehicle, and in the latter inorganic anticorrosive coating materials, an alkyl silicate resin is used as a vehicle. In both cases, an organic solvent is an essential component as a solvent.

Meanwhile, in view of recent environmental problems such as air pollution and marine pollution, aqueous coating materials have been developed in which volatile organic compounds (VOC) such as organic solvents are reduced (see Patent Documents 1 and 2).

For example, the aqueous anticorrosive coating material disclosed in Patent Document 2 is a coating material including two liquids and one powder, that is, including a combination of a main agent containing an epoxy resin emulsion, a pigment containing a metal powder such as zinc, and an amine curing agent. These three agents are mixed immediately before application and then used.

This coating material is a non-hazardous material and thus has high safety against fire, and has a small odor and thus has a small load on workers and the surrounding environment.

PRIOR ART DOCUMENTS

Patent Documents

Patent Document 1: JP-A H10-130545
Patent Document 2: JP-A 2008-272666

SUMMARY OF INVENTION

Technical Problem

However, in an aqueous anticorrosive coating material before moisture is completely removed from the coating film, the metal powder such as zinc and the moisture in the coating material may react with each other to generate a hydrogen gas. Such a phenomenon leads to generation of bubbles in the coating film, and as a result, the coating film surface has insufficient smoothness that causes deterioration of the appearance. For this reason, there is a demand for a method of temporarily preventing a reaction between a metal powder such as a zinc powder and moisture and activating the metal powder after a lapse of a certain time.

Furthermore, for the reason of, for example, improving the workability at the time of preparing and applying a coating material, there is a demand for improvement in the dispersibility of a metal powder in an aqueous solution.

The present invention has been made in view of the above circumstances, and an object of the present invention is to provide a resin-coated metal powder having sufficient dispersibility in an aqueous solution and stability for a relatively long time even in a state of coexisting with moisture in an aqueous coating material, a method for producing the resin-coated metal powder, and an aqueous coating composition using the resin-coated metal powder.

Solution to Problem

As a result of intensive studies to solve the above problems, the present inventors have found the following fact, and have completed the present invention. That is, a metal powder having a surface coated with a specific hydrolyzable resin can temporarily prevent a reaction between the metal and moisture even in an environment in which the metal powder coexists with moisture, and the hydrolyzable resin included in the coating reacts with moisture after a lapse of a certain time, and at least a part of the hydrolyzable resin is decomposed to activate the metal powder, so that the metal powder according to the present invention is useful as an additive for an aqueous coating composition.

That is, the present invention provides:
1. A resin-coated metal powder including a metal powder and a hydrolyzable resin, the metal powder having a surface at least partially coated with the hydrolyzable resin, the hydrolyzable resin having an average composition of the general formula (1) described below, and having a polystyrene-equivalent numerical average molecular weight of 500 to 100,000 by gel permeation chromatography:

[Chem. 1]

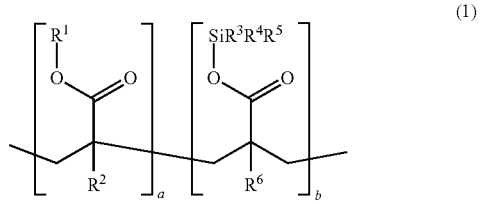

wherein $R^1$ represents a linear or branched monovalent hydrocarbon group having 1 to 10 carbon atoms, the linear or branched monovalent hydrocarbon group in which a part or all of hydrogen atoms may be substituted with an alkoxyalkyl group, an alkoxysilyl group, a hydroxyalkyl group, a polyoxyalkylene group, or a terminal alkyl polyoxyalkylene group, $R^3$, $R^4$, and $R^5$ each independently represent a linear or branched monovalent hydrocarbon group having 1 to 10 carbon atoms, $R^2$ and $R^6$ each independently represent a hydrogen atom or a linear or branched monovalent hydrocarbon group having 1 to 10 carbon atoms, and a and b represent numbers satisfying $0 \leq a < 1$, $0 < b \leq 1$, and $a+b=1$;

2. The resin-coated metal powder of 1, wherein $R^3$, $R^4$, and $R^5$ each independently represent a linear or branched monovalent hydrocarbon group having 1 to 4 carbon atoms;

3. The resin-coated metal powder of 1 or 2, wherein the metal powder is a zinc powder;

4. A method for producing the resin-coated metal powder of any one of 1 to 3, including mixing the metal powder and a solution containing the hydrolyzable resin having the general formula (1) described above, and coating at least a part of a surface of the metal powder with the hydrolyzable resin;

5. A method for producing the resin-coated metal powder of any one of 1 to 3, including mixing the metal powder and a silane coupling agent previously to obtain the metal powder treated with the silane coupling agent, the silane coupling agent having a polymerizable group having the general formula (2) described below:

[Chem. 2]

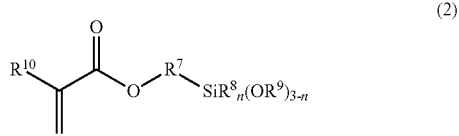

(2)

wherein $R^7$ represents a linear or branched divalent hydrocarbon group having 1 to 10 carbon atoms, $R^8$ and $R^9$ represent a linear or branched monovalent hydrocarbon group having 1 to 10 carbon atoms, n represents an integer of 0 to 2, and $R^{10}$ represents a hydrogen atom or a linear or branched monovalent hydrocarbon group having 1 to 10 carbon atoms, and subjecting the metal powder treated with the silane coupling agent, a polymerizable monomer having the general formula (3) described below:

[Chem. 3]

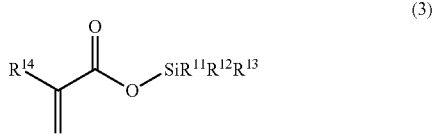

(3)

wherein $R^{11}$, $R^{12}$, and $R^{13}$ each independently represent a linear or branched monovalent hydrocarbon group having 1 to 10 carbon atoms, and $R^{14}$ represents a hydrogen atom or a linear or branched monovalent hydrocarbon group having 1 to 10 carbon atoms, and a silane coupling agent having a polymerizable group having the general formula (2) described above and/or a polymerizable monomer having the general formula (4) described below:

[Chem. 4]

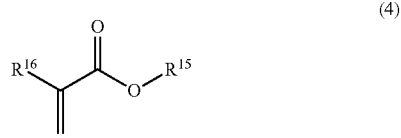

(4)

wherein $R^{15}$ represents a linear or branched monovalent hydrocarbon group having 1 to 10 carbon atoms, and $R^{16}$ represents a hydrogen atom or a linear or branched monovalent hydrocarbon group having 1 to 10 carbon atoms to radical polymerization reaction to coat at least a part of a surface of the metal powder treated with the silane coupling agent with the hydrolyzable resin; and 6. an aqueous coating composition including the resin-coated metal powder of any one of 1 to 3 and an epoxy resin emulsion.

Advantageous Effects of Invention

The resin-coated metal powder of the present invention has a surface partially or entirely coated with a specific hydrolyzable resin that reacts with moisture and gradually decomposes, and thus the resin-coated metal powder exhibits temporary stability against moisture. That is, coating with the hydrolyzable resin can suppress the reaction, between the metal powder and the moisture in the aqueous coating material, that causes generation of a hydrogen gas for a certain time until the coating film is dried, and as a result, a smooth coated surface is obtained. Furthermore, after a lapse of a certain time, the hydrolyzable resin hydrolyzes to cause exposure of the metal surface coated with the hydrolyzable resin, and as a result, the metal powder is activated.

In addition, the surface of the metal powder is modified with the resin having a bulky substituent such as a trialkylsilyl group, and therefore the steric repulsion between particles in the metal powder is increased to improve the dispersibility in the aqueous coating composition.

The resin-coated metal powder having the above characteristics can be widely used for coating materials, inks, pastes, and the like. In particular, the resin-coated metal powder can be used for a zinc rich paint, decorative coating materials, magnetic coating materials, heat shielding coating materials, conductive inks and pastes, and the like.

DESCRIPTION OF EMBODIMENTS

Hereinafter, the present invention is specifically described.

[1] Resin-Coated Metal Powder

The resin-coated metal powder according to the present invention includes a metal powder having a surface at least partially coated with a hydrolyzable resin having an average composition of the general formula (1) described below and having a polystyrene-equivalent numerical average molecular weight of 500 to 100,000 by gel permeation chromatography.

[Chem. 5]

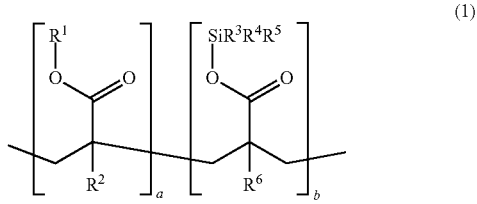

$$(1)$$

In the general formula (1), $R^1$ represents a linear or branched monovalent hydrocarbon group having 1 to 10, preferably 1 to 6, and more preferably 1 to 4 carbon atoms.

Specific examples of the monovalent hydrocarbon group as $R^1$ include linear alkyl groups such as methyl, ethyl, n-propyl, n-butyl, n-pentyl, n-hexyl, n-heptyl, n-octyl, and decyl groups, and branched alkyl groups such as isopropyl, isobutyl, sec-butyl, tert-butyl, neopentyl, texyl, and 2-ethylhexyl groups.

In the monovalent hydrocarbon group, a part or all of hydrogen atoms may be substituted with an alkoxyalkyl group, an alkoxysilyl group, a hydroxyalkyl group, a polyoxyalkylene (polyalkyleneoxy) group, or a terminal alkyl polyoxyalkylene (polyalkyleneoxy) group.

The total number of carbon atoms in the alkoxyalkyl group is not particularly limited, and is preferably 2 to 10, more preferably 2 to 6, and still more preferably 2 to 4.

Specific examples of the alkoxyalkyl group include linear alkoxyalkyl groups such as methoxymethyl, ethoxymethyl, 2-methoxyethyl, 2-ethoxyethyl, and 3-methoxypropyl groups, and branched alkoxyalkyl groups such as 1-methoxyethyl, 1-ethoxyethyl, 1-methoxypropyl, and 2-methoxypropyl groups.

The total number of carbon atoms in the alkoxysilyl group is not particularly limited, and is preferably 3 to 10, more preferably 3 to 8, and still more preferably 3 to 6.

Specific examples of the alkoxysilyl group include trimethoxysilyl, methyldimethoxysilyl, dimethylmethoxysilyl, triethoxysilyl, methyldiethoxysilyl, and dimethylethoxysilyl groups.

The alkoxysilyl group can chemically bond to the metal surface. Specifically, in a case where a part or all of hydrogen atoms in $R^1$ are substituted with the alkoxysilyl group, a part or all of the ester silane moieties may be chemically bonded to the surface of the metal powder.

The number of carbon atoms in the hydroxyalkyl group is not particularly limited, and is preferably 1 to 10, more preferably 1 to 6, and still more preferably 1 to 4.

Specific examples of the hydroxyalkyl group include linear hydroxyalkyl groups such as hydroxymethyl, 2-hydroxyethyl, 3-hydroxypropyl, and 4-hydroxybutyl groups, and branched hydroxyalkyl groups such as 1-hydroxyethyl, 1-hydroxy-1-methylethyl, 1-hydroxypropyl, and 2-hydroxypropyl groups.

The total number of carbon atoms in the polyoxyalkylene group is not particularly limited, and is preferably 1 to 40, more preferably 1 to 30, and still more preferably 1 to 20.

Specific examples of the polyoxyalkylene group include hydroxymethoxy, 2-hydroxyethoxy, (hydroxymethoxy)methoxy, 2-(2-hydroxyethoxy)ethoxy, ((hydroxymethoxy)methoxy)methoxy, and 2-(2-(2-hydroxyethoxy)ethoxy)ethoxy groups.

The total number of carbon atoms in the terminal alkyl polyoxyalkylene (polyalkyleneoxy) group is not particularly limited, and is preferably 2 to 40, more preferably 2 to 30, and still more preferably 2 to 20.

Specific examples of the terminal alkyl polyoxyalkylene group include methoxymethoxy, 2-ethoxyethoxy, (methoxymethoxy)methoxy, and 2-(2-ethoxyethoxy)ethoxy groups.

Among these groups, methyl, ethyl, trimethoxysilylpropyl, and trimethoxysilyloctyl groups are preferable as $R^1$ from the viewpoint of availability of the raw material.

$R^3$, $R^4$, and $R^5$ each independently represent a linear or branched monovalent hydrocarbon group having 1 to 10, preferably 1 to 6, and more preferably 1 to 4 carbon atoms.

Specific examples of the monovalent hydrocarbon group include the same groups as the examples of $R^1$ described above. Meanwhile, $R^3$, $R^4$, and $R^5$, which are substituents on a silicon atom, contribute to the hydrolyzability of the resin, and therefore, as $R^3$, $R^4$, and $R^5$, methyl, ethyl, and isopropyl groups are preferable from the viewpoint of ensuring appropriate reactivity, and an isopropyl group is more preferable in consideration of further enhancing the dispersibility of the resin-coated metal powder in water or in a coating material composition.

$R^2$ and $R^6$ represent a hydrogen atom or a linear or branched monovalent hydrocarbon group having 1 to 10, preferably 1 to 6, and more preferably 1 to 4 carbon atoms.

Specific examples of the monovalent hydrocarbon group include the same groups as the examples of $R^1$ described above, and as $R^2$ and $R^6$, a hydrogen atom and a methyl group are preferable from the viewpoint of adhesion of the hydrolyzable resin to the metal powder.

In the general formula (1), a and b represent numbers satisfying $0 \le a < 1$, $0 < b \le 1$, and $a+b=1$, and are preferably numbers satisfying $0.02 < a < 0.98$, $0.02 < b < 0.98$, and $a+b=1$, more preferably $0.02 \le a < 0.50$, $0.50 < b \le 0.98$, and $a+b=1$, still more preferably $0.02 \le a < 0.40$, $0.60 < b \le 0.98$, and $a+b=1$, and particularly preferably $0.02 \le a < 0.30$, $0.70 < b \le 0.98$, and $a+b=1$.

The proportion of the silyl ester contained in the hydrolyzable resin contributes to the hydrolyzability of the resin. In a case where $R^3$, $R^4$, and $R^5$ are a linear monovalent hydrocarbon group, a and b are more preferably numbers satisfying $0.10 < a < 0.98$, $0.02 < b < 0.90$, and $a+b=1$, more preferably $0.10 \le a < 0.50$, $0.50 < b \le 0.90$, and $a+b=1$, still more preferably $0.10 \le a < 0.40$, $0.60 < b \le 0.90$, and $a+b=1$, and particularly preferably $0.10 \le a < 0.30$, $0.70 < b \le 0.90$, and $a+b=1$ from the viewpoint of ensuring appropriate reactivity.

In a case where $R^3$, $R^4$, and $R^5$ are a branched monovalent hydrocarbon group, a and b are more preferably numbers satisfying $0.05 < a < 0.98$, $0.02 < b < 0.95$, and $a+b=1$, more preferably $0.05 \le a < 0.50$, $0.50 < b \le 0.95$, and $a+b=1$, still more preferably $0.05 \le a < 0.40$, $0.60 < b \le 0.95$, and $a+b=1$, and particularly preferably $0.05 \le a < 0.30$, $0.70 < b \le 0.95$, and $a+b=1$.

As described above, the hydrolyzable resin having an average composition of the general formula (1) has a polystyrene-equivalent numerical average molecular weight of 500 to 100,000, preferably 1,000 to 100,000, more preferably 2,000 to 50,000, and still more preferably 2,500 to 20,000 by gel permeation chromatography (hereinafter, also referred to as "GPC"). The conditions of GPC are as described in Examples.

The hydrolyzable resin can be produced by known radical polymerization using acrylate monomers that give a constituent unit.

Specific examples of the acrylate monomer that gives the unit whose number is represented by a include acrylate monomers having an alkyl group, such as methyl acrylate, methyl methacrylate, ethyl acrylate, ethyl methacrylate, n-butyl acrylate, n-butyl methacrylate, 2-ethylhexyl acrylate, and 2-ethylhexyl methacrylate, acrylate monomers having an alkoxyalkyl group, such as methoxymethyl acrylate, ethoxymethyl acrylate, methoxymethyl methacrylate, and ethoxymethyl methacrylate, acrylate monomers having an alkoxysilyl group, such as 3-trimethoxysilylpropyl acrylate, 3-methyldimethoxysilylpropyl acrylate, 3-dimethylmethoxysilylpropyl acrylate, 3-triethoxysilylpropyl acrylate, 3-methyldiethoxysilylpropyl acrylate, 3-dimethylethoxysilylpropyl acrylate, 3-trimethoxysilylpropyl methacrylate, 3-methyldimethoxysilylpropyl methacrylate, 3-dimethylmethoxysilylpropyl methacrylate, 3-triethoxysilylpropyl methacrylate, 3-methyldiethoxysilylpropyl methacrylate, 3-dimethylethoxysilylpropyl methacrylate, 3-trimethoxysilyloctyl acrylate, 3-methyldimethoxysilyloctyl acrylate, 3-dimethylmethoxysilyloctyl acrylate, 3-triethoxysilyloctyl acrylate, 3-methyldiethoxysilyloctyl acrylate, 3-dimethylethoxysilyloctyl acrylate, 3-trimethoxysilyloctyl methacrylate, 3-methyldimethoxysilyloctyl methacrylate, 3-dimethylmethoxysilyloctyl methacrylate, 3-triethoxysilyloctyl methacrylate, 3-methyldiethoxysilyloctyl methacrylate, and 3-dimethylethoxysilyloctyl methacrylate, acrylate monomers having a hydroxyalkyl group, such as hydroxymethyl acrylate, 2-hydroxyethyl acrylate, hydroxymethyl methacrylate, and 2-hydroxyethyl methacrylate, acrylate monomers having a polyoxyalkylene group, such as hydroxymethoxy acrylate and hydroxymethoxy methacrylate, and acrylate monomers having a terminal alkyl polyoxyalkylene group, such as methoxymethoxy acrylate and methoxymethoxy methacrylate.

Specific examples of the acrylate monomer that gives the unit whose number is represented by b include acrylate monomers having a trialkylsilyl group, such as trimethylsilyl acrylate, trimethylsilyl methacrylate, triethylsilyl acrylate, triethylsilyl methacrylate, triisopropylsilyl acrylate, triisopropylsilyl methacrylate, tert-butyldimethylsilyl acrylate, and tert-butyldimethylsilyl methacrylate.

The metal powder coated with the hydrolyzable resin is not particularly limited, and examples of the metal powder include a magnesium powder, an aluminum powder, a zinc powder, an iron powder, a nickel powder, a tin powder, a lead powder, and a copper powder. Among these powders, a zinc powder, a magnesium powder, an aluminum powder, and an iron powder are preferable, and a zinc powder is more preferable, from the viewpoint of metal toxicity.

The mean particle size of the metal powder measured with a laser diffraction/scattering method is not particularly limited, and is preferably 1 to 12 μm and more preferably 2 to 10 μm from the viewpoint of improving the sedimentation resistance of the metal powder.

After coated with the hydrolyzable resin, the resin-coated metal powder preferably has a mean particle size, measured with a laser diffraction/scattering method, of 1 to 20 μm and more preferably 1 to 15 μm.

The mean particle size in the present invention is a volume-based mean particle size, and means a particle size determined as follows. On the basis of the particle size distribution of the metal powder or the resin-coated metal powder in a dispersion, a cumulative curve is obtained in which the total volume of the metal powder or the resin-coated metal powder is set to 100%, then the point at which the cumulative volume is 50% is determined, and the particle size at the point is determined as the mean particle size.

[2] Method for Producing Resin-Coated Metal Powder

The resin-coated metal powder of the present invention can be produced, for example, by mixing the hydrolyzable resin having the general formula (1), the metal powder, and a solvent used as necessary in an arbitrary order.

In this case, a stirring device can be used such as a magnetic stirrer, a mechanical stirrer, a spray dryer, or a rotation-revolution mixer to mix the materials efficiently.

The amount of the hydrolyzable resin added to the metal powder is not particularly limited, and is preferably 0.5 to 10.0 wt % and more preferably 1.0 to 5.0 wt % from the viewpoint of ensuring the stability, to water, of the resin-coated metal powder coated with the hydrolyzable resin.

Specific examples of the solvent used as necessary include aliphatic or aromatic hydrocarbon-based solvents such as pentane, hexane, cyclohexane, heptane, isooctane, benzene, toluene, and xylene, ether-based solvents such as diethyl ether, tetrahydrofuran, and dioxane, ester-based solvents such as ethyl acetate and butyl acetate, aprotic polar solvents such as acetonitrile, N,N-dimethylformamide, and N-methylpyrrolidone, and chlorinated hydrocarbon-based solvents such as dichloromethane and chloroform. These solvents may be used alone or in admixture of two or more.

Among these solvents, aromatic hydrocarbon-based solvents such as toluene and xylene are preferable from the viewpoint of the solubility of the hydrolyzable resin.

When the solvent is used, the amount of the solvent used is not particularly limited, and preferably gives a concentration of the hydrolyzable resin of 0.01 to 50 wt %, and more preferably 0.1 to 30 wt %.

After mixing the components, the resulting mixture may be dried as necessary for the purpose of, for example, removing the solvent.

The drying can be performed under freely selected conditions, that is, under atmospheric pressure or reduced pressure, and at room temperature or under heating. When the solvent is used, the mixture of the components is preferably heated and dried under reduced pressure from the viewpoint of reducing the residual solvent.

Furthermore, after mixing the components and then drying the resulting mixture as necessary, the dried mixture may be pulverized for the purpose of, for example, adjusting the particle size to obtain the above-described mean particle size.

The pulverization can be performed with a conventionally known method using, for example, a pulverizer such as a hammer mill, a pin mill, a tumbling mill, a vibrating mill, a planetary mill, a roller mill, or a jet mill.

The resin-coated metal powder of the present invention can also be produced by mixing the metal powder and a silane coupling agent having a polymerizable group having the general formula (2) described below previously to obtain the metal powder treated with the silane coupling agent, and subjecting the metal powder treated with the silane coupling agent, a polymerizable monomer having the general formula (3) described below, and a silane coupling agent having a polymerizable group having the general formula (2) described below and/or a polymerizable monomer having the general formula (4) described below to radical polymerization reaction.

[Chem. 6]

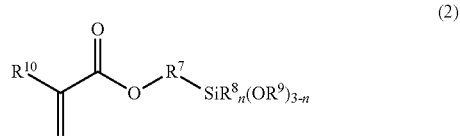

(2)

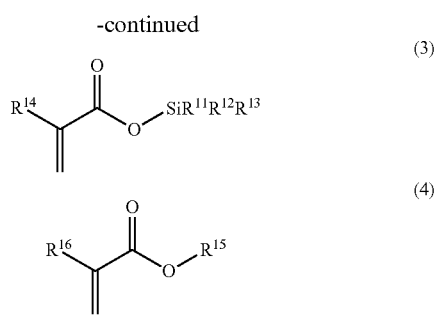

In the general formula (2), $R^7$ represents a linear or branched divalent hydrocarbon group having 1 to 10, preferably 1 to 9, and more preferably 1 to 8 carbon atoms.

Specific examples of the divalent hydrocarbon group as $R^7$ include linear alkylene groups such as methylene, ethylene, trimethylene, butylene, pentylene, hexylene, and octylene groups, and branched alkylene groups such as propylene, isobutylene, and isopentylene groups, and from the viewpoint of availability of the raw material, linear alkylene groups are preferable, and trimethylene and octylene groups are more preferable.

In the general formula (2), $R^8$ and $R^9$ represent a linear or branched monovalent hydrocarbon group having 1 to 10, preferably 1 to 5, and more preferably 1 to 3 carbon atoms.

Specific examples of the monovalent hydrocarbon group include the same substituents as the examples of $R^1$ described above, and from the viewpoint of ensuring reactivity between the metal surface and the silane coupling agent, methyl and ethyl groups are preferable.

In the general formula (2), $R^{10}$ represents a hydrogen atom or a linear or branched monovalent hydrocarbon group having 1 to 10, preferably 1 to 6, and more preferably 1 to 4 carbon atoms.

Specific examples of the monovalent hydrocarbon group include the same substituents as the examples of $R^1$ described above, and as $R^{10}$, a hydrogen atom and a methyl group are preferable from the viewpoint of ensuring reactivity of the polymerizable monomer.

Specific examples of the silane coupling agent having a polymerizable group having the general formula (2) include 3-trimethoxysilylpropyl acrylate, 3-methyldimethoxysilylpropyl acrylate, 3-dimethylmethoxysilylpropyl acrylate, 3-triethoxysilylpropyl acrylate, 3-methyldiethoxysilylpropyl acrylate, 3-dimethylethoxysilylpropyl acrylate, 3-trimethoxysilylpropyl methacrylate, 3-methyldimethoxysilylpropyl methacrylate, 3-dimethylmethoxysilylpropyl methacrylate, 3-triethoxysilylpropyl methacrylate, 3-methyldiethoxysilylpropyl methacrylate, 3-dimethylethoxysilylpropyl methacrylate, 3-trimethoxysilyloctyl acrylate, 3-methyldimethoxysilyloctyl acrylate, 3-dimethylmethoxysilyloctyl acrylate, 3-triethoxysilyloctyl acrylate, 3-methyldiethoxysilyloctyl acrylate, 3-dimethylethoxysilyloctyl acrylate, 3-trimethoxysilyloctyl methacrylate, 3-methyldimethoxysilyloctyl methacrylate, 3-dimethylmethoxysilyloctyl methacrylate, 3-triethoxysilyloctyl methacrylate, 3-methyldiethoxysilyloctyl methacrylate, and 3-dimethylethoxysilyloctyl methacrylate.

The addition amount of the silane coupling agent having a polymerizable group is not particularly limited, and is preferably 0.1 to 5.0 wt % and more preferably 0.5 to 2.0 wt % per the amount of the metal powder from the viewpoint of sufficiently treating the surface of the metal powder.

In the general formula (3), $R^{11}$, $R^{12}$, and $R^{13}$ each independently represent a linear or branched monovalent hydrocarbon group having 1 to 10, preferably 1 to 6, and more preferably 1 to 4 carbon atoms.

Specific examples of the monovalent hydrocarbon group as $R^{11}$, $R^{12}$, and $R^{13}$ include the same substituents as the examples of $R^1$ described above. Meanwhile, $R^{11}$, $R^{12}$, and $R^{13}$, which are substituents on a silicon atom, contribute to the hydrolyzability of the resin, and therefore, as $R^{11}$, $R^{12}$, and $R^{13}$, methyl, ethyl, and isopropyl groups are preferable from the viewpoint of ensuring appropriate reactivity, and an isopropyl group is more preferable in consideration of further enhancing the dispersibility of the resin-coated metal powder in water or in a coating material composition.

In the general formula (3), $R^{14}$ represents a hydrogen atom or a linear or branched monovalent hydrocarbon group having 1 to 10, preferably 1 to 6, and more preferably 1 to 4 carbon atoms.

Specific examples of the monovalent hydrocarbon group as $R^{14}$ include the same groups as the examples of $R^1$ described above, and as $R^{14}$, a hydrogen atom and a methyl group are preferable from the viewpoint of ensuring reactivity of the polymerizable monomer.

Specific examples of the polymerizable monomer having the general formula (3) include acrylate monomers having a trialkylsilyl group, such as trimethylsilyl acrylate, trimethylsilyl methacrylate, triethylsilyl acrylate, triethylsilyl methacrylate, triisopropylsilyl acrylate, triisopropylsilyl methacrylate, tert-butyldimethylsilyl acrylate, and tert-butyldimethylsilyl methacrylate.

In the general formula (4), $R^{15}$ represents a linear or branched monovalent hydrocarbon group having 1 to 10, preferably 1 to 6, and more preferably 1 to 4 carbon atoms.

Specific examples of the monovalent hydrocarbon group as $R^{15}$ include the same substituents as the examples of $R^1$ described above, and from the viewpoint of availability of the raw material, methyl, ethyl, butyl, and octyl groups are preferable.

In the general formula (4), $R^{16}$ represents a hydrogen atom or a linear or branched monovalent hydrocarbon group having 1 to 10, preferably 1 to 6, and more preferably 1 to 4 carbon atoms.

Specific examples of the monovalent hydrocarbon group as $R^{15}$ include the same substituents as the examples of $R^1$ described above, and from the viewpoint of ensuring reactivity of the polymerizable monomer, a hydrogen atom and a methyl group are preferable.

Specific examples of the polymerizable monomer having the general formula (4) include methyl acrylate, methyl methacrylate, ethyl acrylate, ethyl methacrylate, n-butyl acrylate, n-butyl methacrylate, 2-ethylhexyl acrylate, and 2-ethylhexyl methacrylate.

The method of mixing the metal powder and the silane coupling agent having a polymerizable group having the general formula (2) is freely selected, and can be appropriately selected from various known methods.

In the mixing, a stirring device can be used such as a magnetic stirrer, a mechanical stirrer, a spray dryer, or a rotation-revolution mixer to mix the materials efficiently.

The treatment with the silane coupling agent may be performed at room temperature or under heating, and it is preferable that after mixing at room temperature, heating be finally performed.

The heating temperature is preferably, for example, about 50 to 120° C.

The method of radical polymerization of the metal powder treated with the silane coupling agent and the polymerizable monomers is also freely selected, and a known method can be employed using a radical polymerization initiator.

In this case, the monomer having the formula (2) and/or the monomer having the formula (4) and the monomer having the formula (3) are used at a ratio within the range in which a and b in the formula (1) are satisfied.

The radical polymerization initiator can also be appropriately selected from known ones, and azo-based compounds are preferable such as 2,2'-azobis(2-methylbutyronitrile), azobisisobutyronitrile, and 2,2'-di(2-hydroxyethyl)azobisisobutyronitrile.

The reaction temperature is usually about 60 to 120° C., and preferably about 70 to 100° C.

The reaction time is usually about 30 minutes to 10 hours, and preferably about 1 to 5 hours.

Although the polymerization reaction proceeds without a solvent, a solvent can be used.

Examples of the usable solvent include hydrocarbon-based solvents such as pentane, hexane, cyclohexane, heptane, isooctane, toluene, xylene, and mesitylene, aprotic polar solvents such as acetonitrile, propionitrile, N,N-dimethylformamide, and N-methylpyrrolidone, halogenated hydrocarbon solvents such as dichloromethane, dichloroethane, and chlorobenzene, and ether-based solvents such as diethyl ether, tetrahydrofuran, dioxane, and dimethoxyethane. These solvents may be used alone or in admixture of two or more. Among the above-described solvents, toluene, xylene, mesitylene, and tetrahydrofuran are particularly preferable.

After completion of the reaction, the resulting product is cooled to room temperature, and then subjected to known post-treatments such as filtration, washing, and drying to obtain a resin-coated metal powder.

[3] Aqueous Coating Composition

The aqueous coating composition of the present invention contains the above-described resin-coated metal powder and an epoxy resin emulsion.

The epoxy resin emulsion contains an epoxy resin, an emulsifier, and a hydrophilic medium, and is preferably obtained by emulsifying and dispersing an epoxy resin using an emulsifier and a hydrophilic medium from the viewpoint of prolongation of the pot life after mixing and improvement of the rust prevention property of the coating film.

The epoxy resin can be appropriately selected, for use, from conventionally known resins having at least two epoxy groups in one molecule, and examples of such a usable resin include bisphenol type epoxy resins such as a bisphenol A type epoxy resin and a bisphenol F type epoxy resin, alicyclic epoxy resins, and polyglycol type epoxy resins. Among these epoxy resins, bisphenol type epoxy resins are preferable from the viewpoint of the rust prevention property, adhesiveness, and the like of the formed coating film.

The epoxy equivalent of the epoxy resin is not particularly limited, and is preferably 50 to 5,000 g/eq and more preferably 75 to 2,500 g/eq in terms of solid content from the viewpoint of prolongation of the pot life after mixing and improvement of the rust prevention property of the coating film.

The polystyrene-equivalent numerical average molecular weight of the epoxy resin by GPC is preferably 200 to 20,000 and more preferably 300 to 10,000 from the same viewpoint.

The emulsifier may be an anionic or nonionic emulsifier, and a nonionic emulsifier is preferable from the viewpoint of prolongation of the pot life after mixing and improvement of the rust prevention property of the coating film.

Specific examples of the emulsifier include anionic polyoxyalkylene compounds such as sodium polyoxyethylene alkyl ether sulfate and ammonium polyoxyethylene alkyl ether sulfate, and nonionic polyoxyalkylene compounds such as polyoxyethylene lauryl ether and polyoxyethylene stearyl ether.

Specific examples of the hydrophilic medium include water, alcohols having 1 to 5 carbon atoms, and mixtures of water and an alcohol having 1 to 5 carbon atoms, and water is preferable from the viewpoint of environmental load.

In the epoxy resin emulsion, the content of the epoxy resin is preferably 20 to 80 wt % and more preferably 30 to 60 wt %, the content of the emulsifier is preferably 1 to 50 wt % and more preferably 1 to 30 wt %, and the content of the hydrophilic medium is preferably 20 to 80 wt % and more preferably 30 to 60 wt % per 100 wt % of the total amount of the epoxy resin, the emulsifier, and the hydrophilic medium in consideration of prolongation of the pot life after mixing, improvement of the rust prevention property of the coating film, and the like.

As the epoxy resin emulsion, a commercially available product can be obtained, and examples of the commercially available product include ADEKA RESIN EM 101-50 (manufactured by ADEKA Corporation) and jER (registered trademark) Series W2821R70 (manufactured by Mitsubishi Chemical Corporation).

The aqueous coating composition of the present invention can be prepared by mixing the resin-coated metal powder and the epoxy resin emulsion with any method.

The content of the epoxy resin in the aqueous coating composition is preferably 5 to 40 parts by weight and more preferably 10 to 25 parts by weight per 100 parts by weight of the resin-coated metal powder from the viewpoint of prolongation of the pot life after mixing and improvement of the rust prevention property of the coating film.

The content of the resin-coated metal powder in the aqueous coating composition (solid content weight of the resin-coated metal powder per the total solid content weight of the epoxy resin emulsion and the resin-coated metal powder) is preferably 70 to 95 wt % and more preferably 75 to 90 wt % from the viewpoint of improvement of the rust prevention property and the strength of the coating film.

The aqueous coating composition of the present invention may contain other additives such as a pigment, a curing agent, a leveling agent, a thixotropic agent, and a dispersant.

Specific examples of the pigment include silica, calcium carbonate, and white carbon.

Specific examples of the curing agent include ethylenediamine, triethylenetetramine, and Fujicure FXI-919 (manufactured by T&K TOKA CO., LTD.).

Specific examples of the leveling agent include KP-323, KP-341, and KP-104 (all manufactured by Shin-Etsu Chemical Co., Ltd.).

Specific examples of the thixotropic agent include THIXOL K-130B and THIXOL K-502 (all manufactured by Kyoeisha Chemical Co., Ltd.).

Specific examples of the dispersant include FLOWLEN AF-1000 and FLOWLEN D-90 (all manufactured by Kyoeisha Chemical Co., Ltd.).

These additives may be used alone or in admixture of two or more.

EXAMPLES

Hereinafter, the present invention is further specifically described with reference to Synthesis Examples and Examples, but the present invention is not limited to the following Examples.

(1) Synthesis of Hydrolyzable Resin

[Synthesis Example 1] Synthesis of Copolymer Resin of Triisopropylsilyl Acrylate/Methyl Methacrylate=60/40 (Weight Ratio)

The inside of a four-necked flask equipped with a stirrer, a reflux condenser, a dropping funnel, and a thermometer was replaced with nitrogen, and while the outside air was shut out of the four-necked flask by the nitrogen gas passing through the open end at the top of the reflux condenser, 78 g of xylene was put into the four-necked flask and stirred at 90° C. To the xylene, a mixture of 46.8 g (0.20 mol) of triisopropylsilyl acrylate, 31.2 g (0.31 mol) of methyl methacrylate, and 0.8 g (4.16 mmol) of 2,2'-azobis(2-methylbutyronitrile) (V-59, manufactured by FUJIFILM Wako Pure Chemical Corporation, the same applies hereinafter) was added dropwise, and the resulting mixture was stirred at 90° C. for 1 hour.

Then, 0.8 g (4.16 mmol) of 2,2'-azobis(2-methylbutyronitrile) was added, and the resulting mixture was further stirred at 90° C. for 1 hour to obtain 157.6 g of a reaction product of the 50 wt % xylene solution (hereinafter, also referred to as "resin 1"). The resin 1 was analyzed by GPC under the following conditions and determined to have a numerical average molecular weight (Mn) of 7,606.

GPC Conditions
- Apparatus: HLC-8420 GPC
- Column: Shodex GPC KF-402 HQ×2
- Eluent: tetrahydrofuran (THF)
- Flow rate: 0.35 mL/min
- Detector: RI
- Column oven temperature: 40° C.
- Reference material: polystyrene

[Synthesis Example 2] Synthesis of Copolymer Resin of Triisopropylsilyl Acrylate/Methyl Methacrylate=40/60 (Weight Ratio)

A reaction was performed in the same manner as in Synthesis Example 1 except that the use amount of triisopropylsilyl acrylate was changed to 31.2 g (0.14 mol) and the use amount of methyl methacrylate was changed to 46.8 g (0.47 mol), and thus 157.6 g of a reaction product of the 50 wt % xylene solution (hereinafter, also referred to as "resin 2") was obtained.

The resin 2 was analyzed by GPC under the above-described conditions and determined to have a numerical average molecular weight (Mn) of 6,105.

[Synthesis Example 3] Synthesis of Copolymer Resin of Triisopropylsilyl Acrylate/Methyl Methacrylate=20/80 (Weight Ratio)

A reaction was performed in the same manner as in Synthesis Example 1 except that the use amount of triisopropylsilyl acrylate was changed to 15.6 g (0.07 mol) and the use amount of methyl methacrylate was changed to 62.4 g (0.62 mol), and thus 157.6 g of a reaction product of the 50 wt % xylene solution (hereinafter, also referred to as "resin 3") was obtained.

The resin 3 was analyzed by GPC under the above-described conditions and determined to have a numerical average molecular weight (Mn) of 8,819.

[Synthesis Example 4] Synthesis of Copolymer Resin of Triisopropylsilyl Methacrylate/Methyl Methacrylate=60/40 (Weight Ratio)

The inside of a four-necked flask equipped with a stirrer, a reflux condenser, a dropping funnel, and a thermometer was replaced with nitrogen, and while the outside air was shut out of the four-necked flask by the nitrogen gas passing through the open end at the top of the reflux condenser, 78 g of xylene was put into the four-necked flask and stirred at 90° C. To the xylene, a mixture of 46.8 g (0.19 mol) of triisopropylsilyl methacrylate, 31.2 g (0.31 mol) of methyl methacrylate, and 0.8 g (4.16 mmol) of 2,2'-azobis(2-methylbutyronitrile) was added dropwise, and the resulting mixture was stirred at 90° C. for 1 hour.

Then, 0.8 g (4.16 mmol) of 2,2'-azobis(2-methylbutyronitrile) was added, and the resulting mixture was further stirred at 90° C. for 1 hour to obtain 157.6 g of a reaction product of the 50 wt % xylene solution (hereinafter, also referred to as "resin 4").

The resin 4 was analyzed by GPC under the above-described conditions and determined to have a numerical average molecular weight (Mn) of 4,762.

[Synthesis Example 5] Synthesis of Copolymer Resin of Triisopropylsilyl Methacrylate/Methyl Methacrylate=40/60 (Weight Ratio)

A reaction was performed in the same manner as in Synthesis Example 4 except that the use amount of triisopropylsilyl methacrylate was changed to 31.2 g (0.13 mol) and the use amount of methyl methacrylate was changed to 46.8 g (0.47 mol), and thus 157.6 g of a reaction product of the 50 wt % xylene solution (hereinafter, also referred to as "resin 5") was obtained.

The resin 5 was analyzed by GPC under the above-described conditions and determined to have a numerical average molecular weight (Mn) of 5,431.

[Synthesis Example 6] Synthesis of Copolymer Resin of Triisopropylsilyl Acrylate/Methyl Acrylate=40/60 (Weight Ratio)

A reaction was performed in the same manner as in Synthesis Example 2 except that methyl methacrylate was changed to methyl acrylate, and thus 157.6 g of a reaction product of the 50 wt % xylene solution (hereinafter, also referred to as "resin 6") was obtained.

The resin 6 was analyzed by GPC under the above-described conditions and determined to have a numerical average molecular weight (Mn) of 3,489.

[Synthesis Example 7] Synthesis of Copolymer Resin of Triisopropylsilyl Methacrylate/Methyl Acrylate=60/40 (Weight Ratio)

A reaction was performed in the same manner as in Synthesis Example 4 except that methyl methacrylate was changed to methyl acrylate, and thus 157.6 g of a reaction product of the 50 wt % xylene solution (hereinafter, also referred to as "resin 7") was obtained.

The resin 7 was analyzed by GPC under the above-described conditions and determined to have a numerical average molecular weight (Mn) of 4,985.

[Synthesis Example 8] Synthesis of Copolymer Resin of Triisopropylsilyl Methacrylate/Methyl Acrylate=40/60 (Weight Ratio)

A reaction was performed in the same manner as in Synthesis Example 5 except that methyl methacrylate was changed to methyl acrylate, and thus 157.6 g of a reaction product of the 50 wt % xylene solution (hereinafter, also referred to as "resin 8") was obtained.

The resin 8 was analyzed by GPC under the above-described conditions and determined to have a numerical average molecular weight (Mn) of 5,035.

(2) Production and Evaluation of Resin-Coated Zinc Powder

Example 1-1

Into a 20 mL screw tube, 120 mg of (resin 1) obtained in Synthesis Example 1 and 6 g of a zinc powder for a zinc rich paint (mean particle size: 5.0 µm) were put. The mixture was stirred for 60 minutes using a rotation-revolution mixer (THINKY MIXER ARE-310, manufactured by THINKY CORPORATION), and then the resulting mixture was heated and dried under the condition of 20 Pa and 90° C. for 2 hours to distill off xylene from the mixture of zinc and the hydrolyzable resin.

The massive zinc coated with the hydrolyzable resin was pulverized with a powerful small pulverizer (Force Mill, manufactured by OSAKA CHEMICAL Co., Ltd.) to obtain a resin-coated zinc powder 1 having a mean particle size of 5 µm. The mean particle size was measured with a laser diffraction/scattering method.

Example 1-2

A resin-coated zinc powder 2 having a mean particle size of 10 µm was obtained in the same manner as in Example 1-1 except that the use amount of the resin 1 was changed to 600 mg.

Example 1-3

A resin-coated zinc powder 3 having a mean particle size of 5 µm was obtained in the same manner as in Example 1-1 except that the resin 1 was changed to the resin 2.

Example 1-4

A resin-coated zinc powder 4 having a mean particle size of 10 µm was obtained in the same manner as in Example 1-3 except that the use amount of the resin 2 was changed to 600 mg.

Example 1-5

A resin-coated zinc powder 5 having a mean particle size of 5 µm was obtained in the same manner as in Example 1-1 except that the resin 1 was changed to the resin 3.

Example 1-6

A resin-coated zinc powder 6 having a mean particle size of 5 µm was obtained in the same manner as in Example 1-1 except that the resin 1 was changed to the resin 4.

Example 1-7

A resin-coated zinc powder 7 having a mean particle size of 10 µm was obtained in the same manner as in Example 1-6 except that the use amount of the resin 4 was changed to 600 mg.

Example 1-8

A resin-coated zinc powder 8 having a mean particle size of 5 µm was obtained in the same manner as in Example 1-1 except that the resin 1 was changed to the resin 5.

Example 1-9

A resin-coated zinc powder 9 having a mean particle size of 10 µm was obtained in the same manner as in Example 1-8 except that the use amount of the resin 5 was changed to 600 mg.

Example 1-10

A resin-coated zinc powder 10 having a mean particle size of 5 µm was obtained in the same manner as in Example 1-1 except that the resin 1 was changed to the resin 6.

Example 1-11

A resin-coated zinc powder 11 having a mean particle size of 10 µm was obtained in the same manner as in Example 1-10 except that the use amount of the resin 6 was changed to 600 mg.

Example 1-12

A resin-coated zinc powder 12 having a mean particle size of 5 µm was obtained in the same manner as in Example 1-1 except that the resin 1 was changed to the resin 7.

Example 1-13

A resin-coated zinc powder 13 having a mean particle size of 10 µm was obtained in the same manner as in Example 1-12 except that the use amount of the resin 7 was changed to 600 mg.

Example 1-14

A resin-coated zinc powder 14 having a mean particle size of 5 µm was obtained in the same manner as in Example 1-1 except that the resin 1 was changed to the resin 8.

Example 1-15

A resin-coated zinc powder 15 having a mean particle size of 10 µm was obtained in the same manner as in Example 1-14 except that the use amount of the resin 8 was changed to 679 mg.

The resin-coated zinc powder was evaluated for the stability and the dispersibility in water with the following method. As a control, an untreated zinc powder for a zinc rich paint was also evaluated in the same manner. Table 1 shows the results.

[1] Evaluation of Stability

Into a test tube, 3 g of each of the resin-coated zinc powders 1 to 15 and the untreated zinc powder for a zinc rich paint, 3 g of pure water, and 300 mg of triethylenetetramine as an amine curing agent were put, and stirred at room temperature until the mixture became uniform. After the mixture became uniform, the stirring was stopped, the test tube was immersed in an oil bath at 50° C., and the time until gas generation was measured.

[2] Evaluation of Dispersibility

Into a test tube, 3 g of each of the resin-coated zinc powders 1 to 15 and the untreated zinc powder for a zinc rich paint, 3 g of pure water, and 300 mg of triethylenetetramine as an amine curing agent were put, and stirred at room temperature until the mixture became uniform. Subsequently, the test tube was immersed in an oil bath at 50° C., and after the mixture was stirred for 1 hour, the dispersibility of the zinc powder was evaluated. In the evaluation of dispersibility, the result "good" indicates a state in which the zinc powder is not aggregated, and the result "poor" indicates a state in which the zinc powder is aggregated.

TABLE 1

| Zinc powder | Time until gas generation (min) | Dispersibility |
| --- | --- | --- |
| Resin-coated zinc powder 1 | 60 | good |
| Resin-coated zinc powder 2 | 120 | good |
| Resin-coated zinc powder 3 | 60 | good |
| Resin-coated zinc powder 4 | 120 | good |
| Resin-coated zinc powder 5 | 150 | good |
| Resin-coated zinc powder 6 | 240 | good |
| Resin-coated zinc powder 7 | 180 | good |
| Resin-coated zinc powder 8 | 180 | good |
| Resin-coated zinc powder 9 | 30 | good |
| Resin-coated zinc powder 10 | 60 | good |
| Resin-coated zinc powder 11 | 60 | good |
| Resin-coated zinc powder 12 | 60 | good |
| Resin-coated zinc powder 13 | 60 | good |
| Resin-coated zinc powder 14 | 60 | good |
| Resin-coated zinc powder 15 | 60 | good |
| Untreated zinc powder | 10 | poor |

Example 1-16

Into a 30 mL screw tube, 30 g of a zinc powder for a zinc rich paint (mean particle size: 4.0 μm) and 300 mg of 3-trimethoxysilylpropyl methacrylate were put. The mixture was stirred for 60 minutes using a rotation-revolution mixer (THINKY MIXER ARE-310, manufactured by THINKY CORPORATION), and then left to stand at 25° C. for 1 hour and heated at 100° C. for 1 hour to obtain a zinc powder treated with the silane coupling agent.

Subsequently, the inside of a four-necked flask equipped with a stirrer, a reflux condenser, a dropping funnel, and a thermometer was replaced with nitrogen, and while the outside air was shut out of the four-necked flask by the nitrogen gas passing through the open end at the top of the reflux condenser, 30 g of the zinc powder treated with the silane coupling agent and 27 g of xylene were put into the four-necked flask and stirred at 90° C. To the zinc powder and the xylene, a mixture of 2.4 g (10.5 mmol) of triisopropylsilyl acrylate, 0.6 g (6.0 mmol) of methyl methacrylate, and 30 mg (0.2 mmol) of 2,2'-azobis(2-methylbutyronitrile) (V-59, manufactured by FUJIFILM Wako Pure Chemical Corporation, the same applies hereinafter) was added dropwise, and the resulting mixture was stirred at 90° C. for 1 hour.

Then, 30 mg (0.2 mmol) of 2,2'-azobis(2-methylbutyronitrile) was added, and the resulting mixture was further stirred at 90° C. for 1 hour. The reaction solution was cooled to room temperature, and successively filtered, washed with xylene (30 mL×2), and dried to obtain a resin-coated zinc powder 16 having a mean particle size of 4.0 μm.

Example 1-17

A resin-coated zinc powder 17 having a mean particle size of 4.0 μm was obtained in the same manner as in Example 1-16 except that the use amount of triisopropylsilyl acrylate was changed to 0.6 g (2.6 mmol) and the use amount of methyl methacrylate was changed to 2.4 g (24.0 mmol).

Example 1-18

A resin-coated zinc powder 18 having a mean particle size of 4.0 μm was obtained in the same manner as in Example 1-16 except that 3-trimethoxysilylpropyl methacrylate was changed to 8-trimethoxysilyloctyl methacrylate.

Example 1-19

A resin-coated zinc powder 19 having a mean particle size of 4.0 μm was obtained in the same manner as in Example 1-16 except that the use amount of 3-trimethoxysilylpropyl methacrylate was changed to 600 mg.

Example 1-20

A resin-coated zinc powder 20 having a mean particle size of 4.0 μm was obtained in the same manner as in Example 1-16 except that the use amount of triisopropylsilyl acrylate was changed to 3.0 g (13.1 mmol) and methyl methacrylate was not used.

The resin-coated zinc powders 16 to 20 were evaluated for the stability and the dispersibility in water with the following method. As a control, an untreated zinc powder for a zinc rich paint was also evaluated in the same manner, and an amine curing agent was not used. Table 2 shows the results.

[3] Evaluation of Stability

Into an eggplant flask, 25 g of each of the resin-coated zinc powders 16 to 20 and the untreated zinc powder for a zinc rich paint and 50 g of pure water were put, and stirred at room temperature until the mixture became uniform. After the mixture became uniform, the stirring was stopped, and the eggplant flask was immersed in a water bath at 40° C. The amount of hydrogen generated in 48 hours was measured with a water replacement method.

[4] Evaluation of Dispersibility

Into an eggplant flask, 25 g of each of the resin-coated zinc powders 16 to 20 and the untreated zinc powder for a zinc rich paint and 50 g of pure water were put, and stirred at room temperature until the mixture became uniform. After the mixture became uniform, the stirring was stopped, the eggplant flask was immersed in a water bath at 40° C., and the dispersibility of the zinc powder after 48 hours was evaluated. In the evaluation of dispersibility, the result "good" indicates a state in which the zinc powder is not aggregated, and the result "poor" indicates a state in which the zinc powder is aggregated.

TABLE 2

| Zinc powder | Amount of hydrogen generated (mL) | Dispersibility |
| --- | --- | --- |
| Resin-coated zinc powder 16 | 2 | good |
| Resin-coated zinc powder 17 | 7 | good |

TABLE 2-continued

| Zinc powder | Amount of hydrogen generated (mL) | Dispersibility |
|---|---|---|
| Resin-coated zinc powder 18 | 5 | good |
| Resin-coated zinc powder 19 | 1 | good |
| Resin-coated zinc powder 20 | 0 | good |
| Untreated zinc powder | 54 | poor |

From Tables 1 and 2, it is found that the resin-coated zinc powder coated with the hydrolyzable resin has significantly higher stability to water and significantly higher dispersibility in an aqueous solution than the untreated zinc powder for a zinc rich paint. It has been also found that after a lapse of a certain time, the hydrolyzable resin was peeled off from the surface of the zinc powder, and the zinc powder was activated.

(3) Production and Evaluation of Aqueous Coating Composition

Example 2-1

With 100 parts by weight of the resin-coated zinc powder 2 obtained in Example 1-2, 24.4 parts by weight of an epoxy resin emulsion (ADEKA RESIN EM 101-50, manufactured by ADEKA Corporation) was mixed, and the mixture was stirred until the mixture became uniform to obtain an aqueous coating composition.

The surface of a steel sheet, SPCC-SB (dimension: 100 mm×50 mm×0.3 mm) was polished and degreased to obtain a substrate, and the aqueous coating composition prepared above was applied to the substrate with a brush at a coating weight of 400 g/m$^2$, and then cured and dried at room temperature. Air bubbles were not generated while the coating film was dried. The obtained coating film had excellent smoothness.

The coating film was used as a test specimen. In accordance with JIS K 5600-7-1, Resistance to neutral spray, a portion in the test specimen was scratched, the test specimen was left to stand for 500 hours in salt spray, and then the degree of generation of rust and swelling in the test specimen was evaluated. As a result, it was confirmed that the test specimen was free of abnormality such as red rust and swelling.

Example 2-2

With 100 parts by weight of the resin-coated zinc powder 16 obtained in Example 1-16, 24.4 parts by weight of an epoxy resin emulsion (ADEKA RESIN EM 101-50, manufactured by ADEKA Corporation) was mixed, and the mixture was stirred until the mixture became uniform to obtain an aqueous coating composition.

The surface of a steel sheet, SPCC-SB (dimension: 100 mm×50 mm×0.3 mm) was polished and degreased to obtain a substrate, and the aqueous coating composition prepared above was applied to the substrate with a brush at a coating weight of 400 g/m$^2$, and then cured and dried at room temperature. Air bubbles were not generated while the coating film was dried. The obtained coating film had excellent smoothness.

The coating film was used as a test specimen. In accordance with JIS K 5600-7-1, Resistance to neutral spray, a portion in the test specimen was scratched, the test specimen was left to stand for 500 hours in salt spray, and then the degree of generation of rust and swelling in the test specimen was evaluated. As a result, it was confirmed that the test specimen was free of abnormality such as red rust and swelling.

The invention claimed is:

1. A resin-coated metal powder comprising:
a metal powder selected from the group consisting of a magnesium powder, an aluminum powder, a zinc powder, an iron powder, a nickel powder, a tin powder, and a lead powder; and
a hydrolyzable resin,
the metal powder having a surface at least partially coated with the hydrolyzable resin,
the hydrolyzable resin being represented by the general formula (1) described below, and having a polystyrene-equivalent numerical average molecular weight of 500 to 100,000 by gel permeation chromatography:

[Chem. 1]

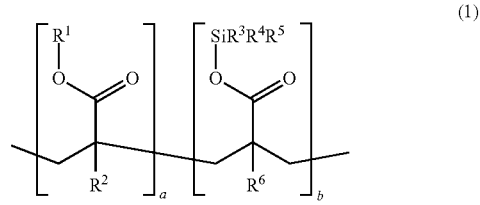

(1)

wherein R$^1$ represents a linear or branched monovalent hydrocarbon group having 1 to 10 carbon atoms, the linear or branched monovalent hydrocarbon group in which a part or all of hydrogen atoms may be substituted with an alkoxyalkyl group, an alkoxysilyl group, a hydroxyalkyl group, a polyoxyalkylene group, or a terminal alkyl polyoxyalkylene group,
R$^3$, R$^4$, and R$^5$ each independently represent a linear or branched monovalent hydrocarbon group having 1 to 10 carbon atoms,
R$^2$ and R$^6$ each independently represent a hydrogen atom or a linear or branched monovalent hydrocarbon group having 1 to 10 carbon atoms, and
a and b represent numbers satisfying 0≤a<1, 0<b≤1, and a +b=1.

2. The resin-coated metal powder of claim 1, wherein R$^3$, R$^4$, and R$^5$ each independently represent a linear or branched monovalent hydrocarbon group having 1 to 4 carbon atoms.

3. The resin-coated metal powder of claim 1, wherein the metal powder is a zinc powder.

4. The resin-coated metal powder of claim 1, wherein the resin-coated metal powder has a mean particle size, measured with a laser diffraction/scattering method, of 1 to 20 μm.

5. An aqueous coating composition comprising:
the resin-coated metal powder of claim 1; and
an epoxy resin aqueous emulsion comprising said epoxy resin and water,
wherein said aqueous coating composition is formed by mixing said resin-coated metal powder with said aqueous emulsion to form said aqueous coating composition.

6. A method for producing a resin-coated metal powder, the method comprising:
mixing a metal powder; and a solution containing a hydrolyzable resin, the metal powder having a surface at least partially coated with the hydrolyzable resin, the hydrolyzable resin being represented by the general formula (1) described below, and having a polystyrene-equivalent numerical average molecular weight of 500 to 100,000 by gel permeation chromatography:

[Chem.1]

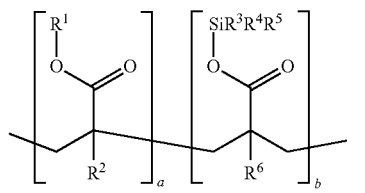

(1)

wherein $R^1$ represents a linear or branched monovalent hydrocarbon group having 1 to 10 carbon atoms, the linear or branched monovalent hydrocarbon group in which a part or all of hydrogen atoms may be substituted with an alkoxyalkyl group, an alkoxysilyl group, a hydroxyalkyl group, a polyoxyalkylene group, or a terminal alkyl polyoxyalkylene group, $R^3$, $R^4$, and $R^5$ each independently represent a linear or branched monovalent hydrocarbon group having 1 to 10 carbon atoms, $R^2$ and $R^6$ each independently represent a hydrogen atom or a linear or branched monovalent hydrocarbon group having 1 to 10 carbon atoms, and a and b represent numbers satisfying $0 \leq a < 1$, $0 < b \leq 1$, and $a + b = 1$; and coating at least a part of said surface of the metal powder with the hydrolyzable resin.

7. The method for producing the resin-coated metal powder of claim 6, wherein said metal powder is selected from the group consisting of a magnesium powder, an aluminum powder, a zinc powder, an iron powder, a nickel powder, a tin powder, and a lead powder.

8. A method for producing a resin-coated metal powder, the method comprising:

mixing a metal powder and a silane coupling agent previously to obtain the metal powder treated with the silane coupling agent, the silane coupling agent having a polymerizable group having the general formula (2) described below:

[Chem. 2]

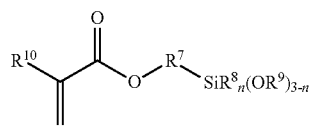

(2)

wherein $R^7$ represents a linear or branched divalent hydrocarbon group having 1 to 10 carbon atoms, $R^8$ and $R^9$ represent a linear or branched monovalent hydrocarbon group having 1 to 10 carbon atoms, n represents an integer of 0 to 2, and $R^{10}$ represents a hydrogen atom or a linear or branched monovalent hydrocarbon group having 1 to 10 carbon atoms; and subjecting the metal powder treated with the silane coupling agent, a polymerizable monomer having the general formula (3) described below:

[Chem. 3]

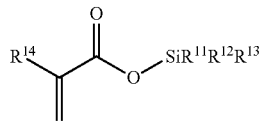

(3)

wherein $R^{11}$, $R^{12}$, and $R^{13}$ each independently represent a linear or branched monovalent hydrocarbon group having 1 to 10 carbon atoms, and $R^{14}$ represents a hydrogen atom or a linear or branched monovalent hydrocarbon group having 1 to 10 carbon atoms, and a silane coupling agent having a polymerizable group having the general formula (2) described above and/or a polymerizable monomer having the general formula (4) described below:

[Chem. 4]

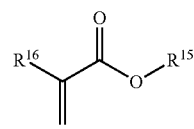

(4)

wherein $R^{15}$ represents a linear or branched monovalent hydrocarbon group having 1 to 10 carbon atoms, and $R^{16}$ represents a hydrogen atom or a linear or branched monovalent hydrocarbon group having 1 to 10 carbon atoms to radical polymerization reaction to coat at least a part of a surface of the metal powder treated with the silane coupling agent with the hydrolyzable resin to produce said resin-coated metal powder, said resin coated metal powder having a surface at least partially coated with the hydrolyzable resin, the hydrolyzable resin being represented by the general formula (1) described below, and having a polystyrene-equivalent numerical average molecular weight of 500 to 100,000 by gel permeation chromatography:

[Chem. 1]

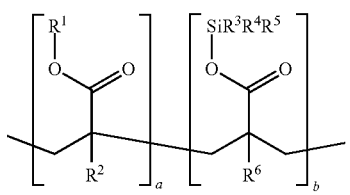

(1)

wherein $R^1$ represents a linear or branched monovalent hydrocarbon group having 1 to 10 carbon atoms, the linear or branched monovalent hydrocarbon group in which a part or all of hydrogen atoms may be substituted with an alkoxyalkyl group, an alkoxysilyl group, a hydroxyalkyl group, a polyoxyalkylene group, or a terminal alkyl polyoxyalkylene group, $R^3$, $R^4$, and $R^5$ each independently represent a linear or branched monovalent hydrocarbon group having 1 to 10 carbon atoms, $R^2$ and $R^6$ each independently represent a hydrogen atom or a linear or branched monovalent hydrocarbon group having 1 to 10 carbon atoms, and a and b represent numbers satisfying $0 \leq a < 1$, $0 < b \leq 1$, and $a + b = 1$.

9. The method for producing the resin-coated metal powder of claim 8, wherein said metal powder is selected from the group consisting of a magnesium powder, an aluminum powder, a zinc powder, an iron powder, a nickel powder, a tin powder, and a lead powder.

* * * * *